(No Model.)  5 Sheets—Sheet 1
H. T. RUSSELL.
DIE FOR FORGING BICYCLE HEAD BLANKS.
No. 250,981.  Patented Dec. 13, 1881.
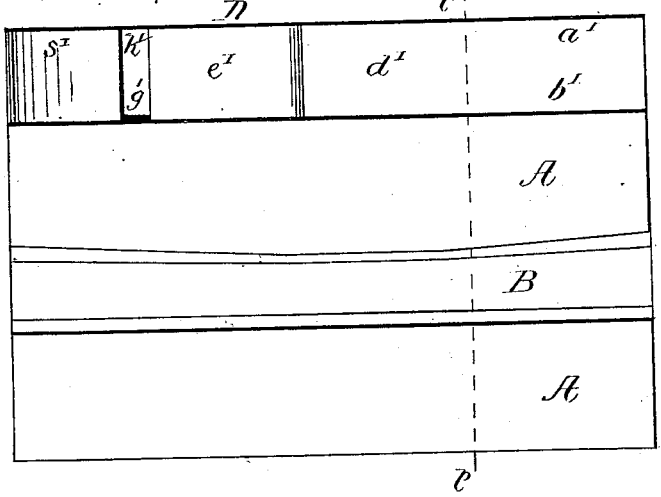
Fig. 1.
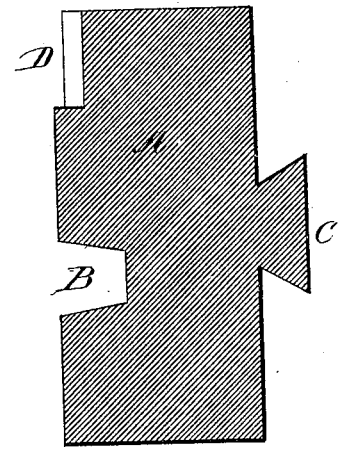
Fig. 2.
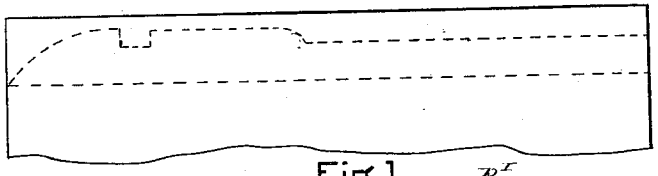
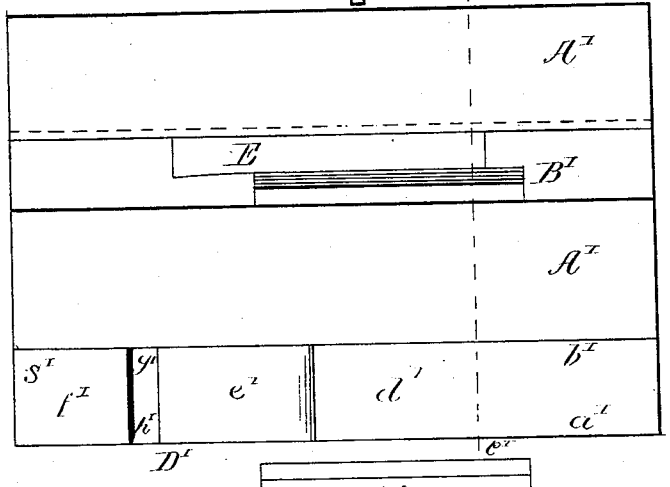
Fig. 3.
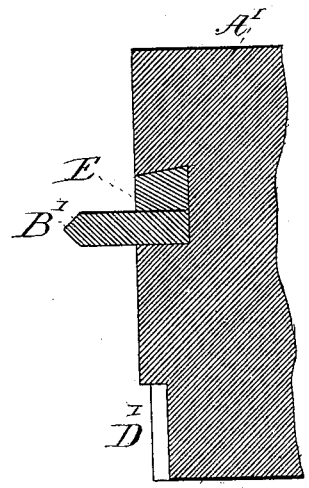
Fig. 4.
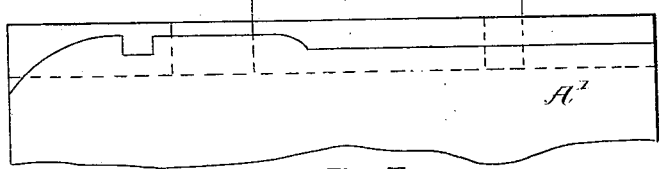
WITNESSES
N. C. Fogg
H. I. Nash
INVENTOR
Henry T. Russell,
By Charles E. Pratt,
Atty (No Model.) 5 Sheets—Sheet 2.

H. T. RUSSELL.
DIE FOR FORGING BICYCLE HEAD BLANKS.

No. 250,981. Patented Dec. 13, 1881.

WITNESSES
N. C. Fogg
H. I. Nash

INVENTOR
Henry T. Russell,
By Charles E. Pratt,
Atty (No Model.) 5 Sheets—Sheet 3.

H. T. RUSSELL.
DIE FOR FORGING BICYCLE HEAD BLANKS.

No. 250,981. Patented Dec. 13, 1881.

WITNESSES
N. C. Fogg
H. J. Nash

INVENTOR
Henry T. Russell,
By Charles E. Pratt,
Atty

N. PETERS, Photo-Lithographer, Washington, D. C.

(No Model.) H. T. RUSSELL. 5 Sheets—Sheet 4.
DIE FOR FORGING BICYCLE HEAD BLANKS.
No. 250,981. Patented Dec. 13, 1881.

WITNESSES
N. C. Fogg
H. I. Nash

INVENTOR
Henry T. Russell,
By Charles E. Pratt,
Atty

N. PETERS. Photo-Lithographer. Washington, D. C.

(No Model.) 5 Sheets—Sheet 5.
H. T. RUSSELL.
DIE FOR FORGING BICYCLE HEAD BLANKS.
No. 250,981. Patented Dec. 13, 1881.

WITNESSES
N. C. Fogg
H. T. Nash

INVENTOR
Henry T. Russell,
By Charles E. Pratt,
atty

UNITED STATES PATENT OFFICE.

HENRY T. RUSSELL, OF HARTFORD, CONNECTICUT, ASSIGNOR TO THE POPE MANUFACTURING COMPANY, OF BOSTON, MASSACHUSETTS.

DIE FOR FORGING BICYCLE-HEAD BLANKS.

SPECIFICATION forming part of Letters Patent No. 250,981, dated December 13, 1881.

Application filed March 12, 1881. (No model.)

*To all whom it may concern:*

Be it known that I, HENRY T. RUSSELL, of the city of Hartford, in the State of Connecticut, have invented certain new and useful Improvements in Dies for Forging Bicycle-Head Blanks, of which the following is a specification, and which are embodied in part in the contrivances represented in the accompanying drawings, and for the remainder are described herein with reference to the said drawings.

Figure 5:
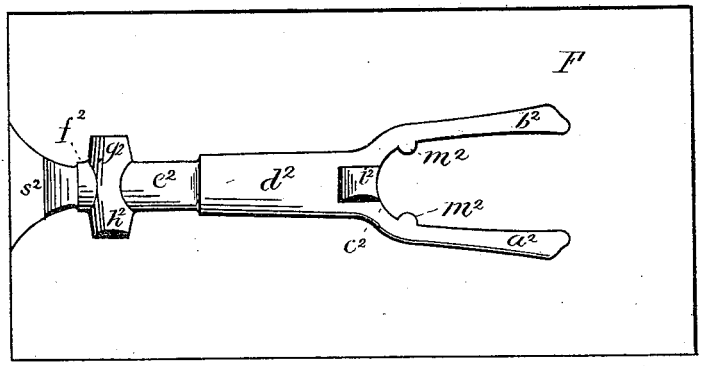
Figure 5:
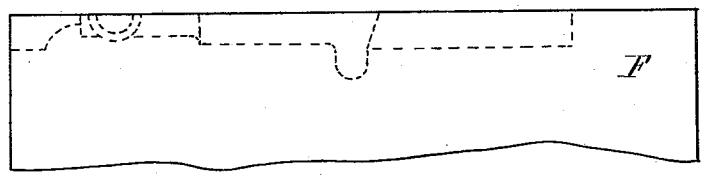
Figure 6:
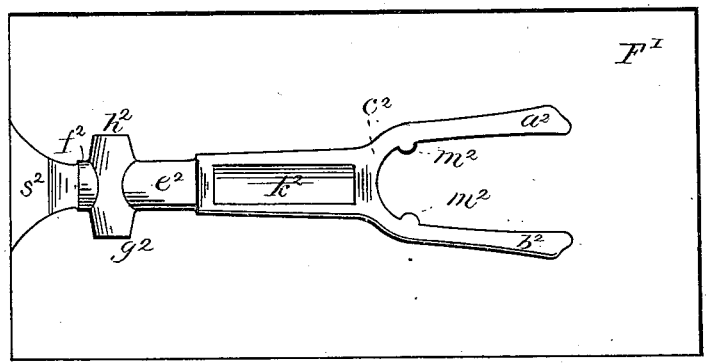
Figure 6:
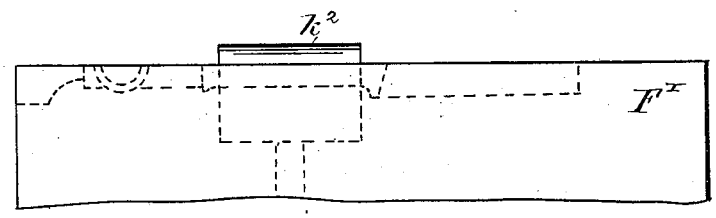
Figure 8:
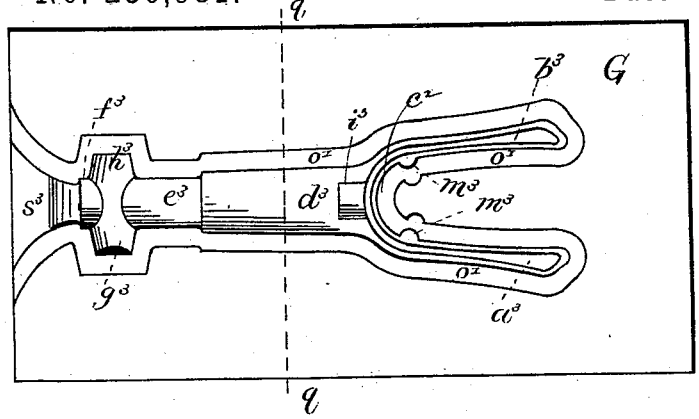
Figure 8:
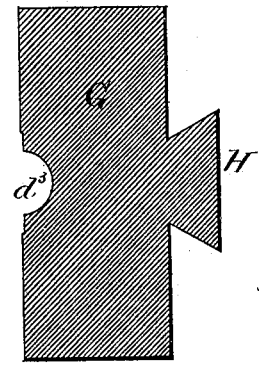
Figure 7:
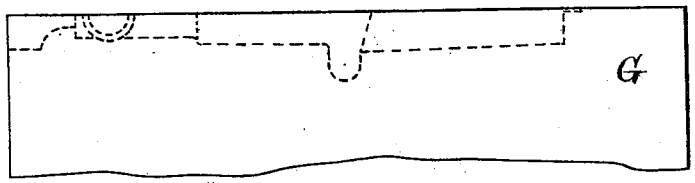
Figure 10:
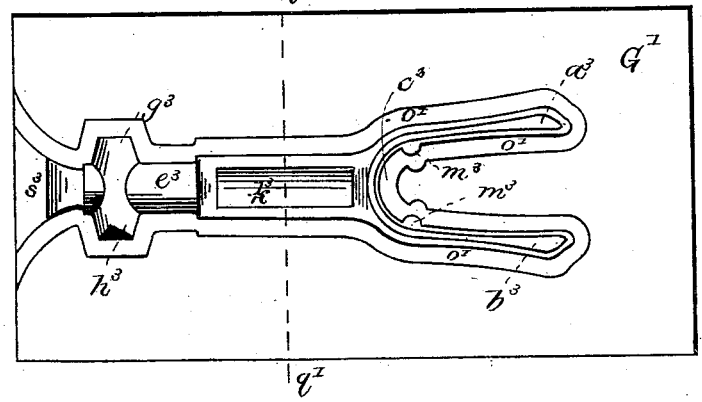
Figure 10:
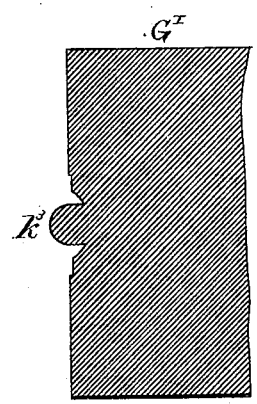
Figure 9:
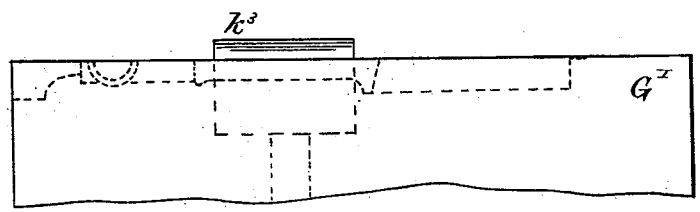
Figure 11:
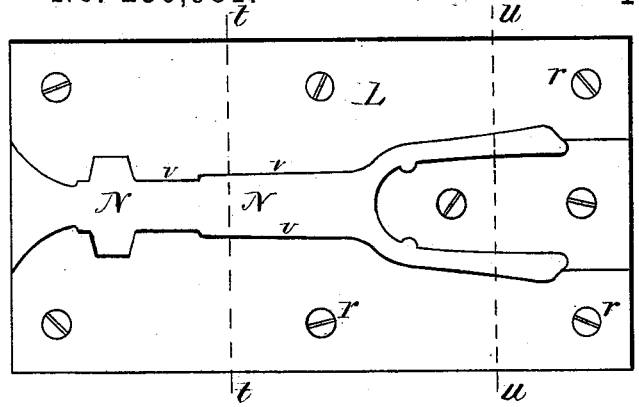
Figure 12:
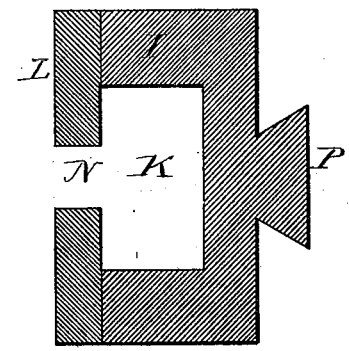
Figure 13:
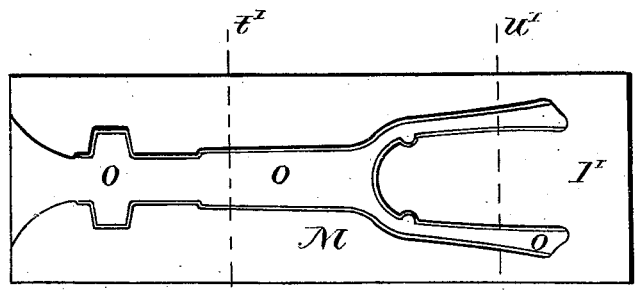
Figure 14:
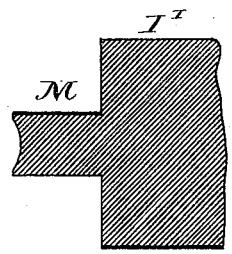
Figure 15:
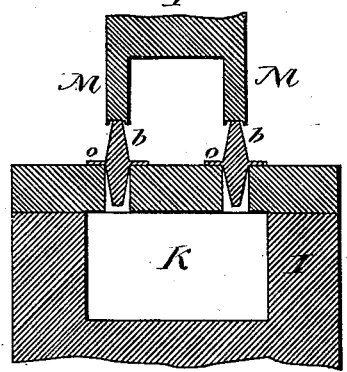
Figure 16:
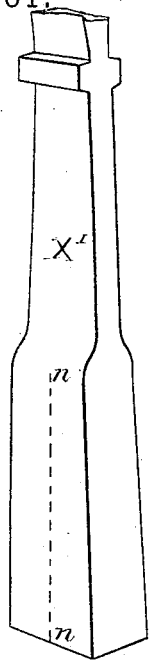
Figure 17:
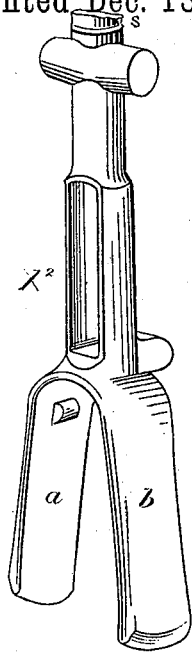
Figure 18:
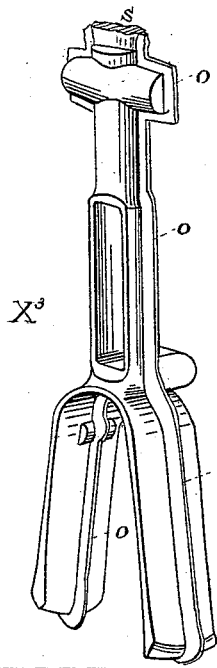

In these drawings Figure 1 shows, first in plan and then in elevation, a breakdown and cutting die. Fig. 2 shows the same in cross-section on the dotted line $p\,p$. Fig. 3 shows, in plan and then in elevation, a corresponding die and cutter, which are also shown in section on the line $p'\,p'$ in Fig. 4. Figs. 5 and 6 show, in plan and in elevation, breakdown-dies respectively. Fig. 7 shows, in plan and then in elevation, a forming-die, of which Fig. 8 shows a section on line $q\,q$. Fig. 9 shows, in plan and then in elevation, a forming-die corresponding to that shown in Fig. 7, and Fig. 10 shows the same in section on the line $q'\,q'$. Fig. 11 shows, in plan, a trimmer, and Fig. 12 shows the same in section on the line $t\,t$. Fig. 13 shows, in plan, a punch, also shown in section on line $t'\,t'$ in Fig. 14. Fig. 15 shows the trimmer and punch in section on the dotted lines $u\,u$ and $u'\,u'$, and the article to be operated upon as in position for operation. Fig. 16 shows, in elevation, the form given to a bar of metal as it comes from the distributing-dies shown in Figs. 1 and 3. Fig. 17 shows the same as it comes from the breakdown-dies shown in Figs. 5 and 6. Fig. 18 shows the same after it has been operated upon by the forming-dies shown in Figs. 7 and 9; and Fig. 19 shows the same after it has been completed, so far as it is the intention of my present machinery and process to complete it—that is, it shows my improved article of manufacture.

My improvement relates to that part of the bicycle structure known as the head, and particularly to that class or style of bicycle-head known as the "closed" or "Stanley" head, and to certain modifications in the form thereof, and to a process of and machinery for producing the same in one solid drop-forging.

Figure 19:
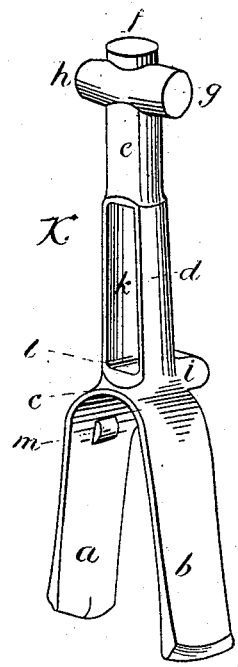

X, in Fig. 19, is a bicycle-head blank, in general formation of the center steering cylindrical or Stanley pattern.

$a\,b$ are branches or arms terminating abruptly at one end, at which they are to be united to the front forks, extending downward to carry the bearings for the large front wheel of the bicycle, and these branches $a\,b$ are brought together at their upper ends into an arched bridge, $c$, which forms the lower part of the head of the machine.

$d$ is the barrel or cylindrical part of the head, which contains the cavity $k$, terminating in a rectangular bottom or blank, $l$, at one end, and which is to receive the lower end of the spindle attached to the perch of the bicycle, and which extends upward to, or nearly to, the smaller cylindrical part $e$, bearing the lugs $h$ and $g$, which are to receive the handle-bars, and the lug or top of the head $f$, through which latter and down to the cavity $k$ is to be bored the hole for receiving the bolt which is to form the upper center or bearing for the spindle attached to the perch.

$i$ is a lug projecting from the lower portion of the barrel or the bridge $c$, designed to receive the elbow of a lever-brake for the front wheel, and which I may designate the "brake-lug."

$m$ is a raised or projecting lug on the inside of the branch $a$, where it begins to curve into the arched bridge $c$, which is designed to receive one end of the trouser-guard for the front wheel and for the inside of the arm $b$; and similarly located, and opposite to $m$, is another lug of the same kind, intended to receive the opposite end of a trouser-guard.

$s$ is the sprue, by which the article operated upon is held to the bar from which it is made until it is completed and ready to be cut off.

$o\,o\,o$ is the "flash," or the slight excess of metal driven off by the forming-dies.

A A is a block of metal containing on one side a distributing-die, D, having the recesses or intaglio parts $s'\,f'\,h'\,g'\,e'\,d'\,a'$.

B is a groove or recess in another part of the block A.

C is a dovetailed tenon, by which the block A may be handled or attached to other parts of a drop-forge in which the block A is to operate as the hammer part, and in which the block A' A' is to operate as the anvil part. This block A' has on one side the die D', corresponding exactly to the die D, having the recesses $s' f' g' e'$, &c., and having in another part a cutter, B', held in a dovetailed slot thereon by the wedge E.

F F' are respectively the hammer and anvil parts of a set of breakdown-dies, having in their surfaces the recesses or intaglio parts $a^2$, $b^2$, $c^2$, $d^2$, $e^2$, $f^2$, $g^2$, $h^2$, $i^2$, $m^2$ $m^2$, and $s^2$, corresponding in form and curvature to the parts $a\ b\ c\ d\ e\ f\ g\ h\ i\ m$ of the head X and the sprue $s$, respectively; and the die F' has also the cameo part $k^2$, corresponding in form and curvature with the cavity $k$ in the head X. The construction of these two dies is such that the shape given to the article is approximate only, and not finished, the parts being slightly larger and less sharply defined than are required in the article produced, and the bearing-edges are rounded slightly, and they may be made of cast-iron or any other suitable metal.

G G' are the corresponding hammer and anvil parts of the dies, constructed of steel, and with the recess or intaglio parts $a^3$, $b^3$, $c^3$, $d^3$, $e^3$, $f^3$, $g^3$, $h^3$, $i^3$, $m^3$ $m^3$, and $o'$, corresponding exactly in form and curvature to the parts $a\ b\ c\ d\ e\ f\ g\ h\ i$ of the head X and the sprue $s$, and also the slight depression or recess cut away around the contour of the other recesses, as at $o'\ o'\ o'$, to receive the flash or slight excess of metal, $o\ o\ o$, struck off in the process of forging, and which is to lie in these recesses, and would prevent the dies G G' from coming together and giving the exact form to the article operated upon. The die G' has the cameo part $k^3$, corresponding in form and curvature with the cavity $k$ in the head X.

H is a dovetailed tenon, by which block G may be handled or attached to other drop-forging mechanism.

I is a metallic block, having a dovetailed tenon, P, for a handle and attachment, and bearing on its face the trimmer L, which is a plate of steel of considerable thickness, screwed to the block I in one or more parts by the screws $r\ r$, or otherwise, and which has an opening, N N, having the cutting-edges $v\ v\ v$, corresponding in outline with the outline of the head $X^3$ along the line of the flash $o\ o\ o$. There is beneath the opening N the cavity K, large enough for the article operated upon to fall into and be withdrawn from.

I' is a metallic block bearing a punch, M M, which projects considerably above the face of the block I', and the bearing-face $o\ o\ o$ of which is substantially conformed to the surface of the head X, and which is so constructed as to drop freely into and through the opening N N in the trimmer L.

Having the machinery thus described, and the blocks A A' being properly arranged in a drop-forge or heavy power-hammer, I take a bar of steel or iron, of suitable dimensions, and heat the end for several inches to the proper degree for forging. I then place the bar on the die D' and cause it to be struck one or more blows with the plain part of the block A, so as to keep the two sides of the bar at right angles to the sides operated upon by the dies D D' nearly straight, and to aid in distributing the metal; then restore the die D' and strike as before. This part of the process shapes the end of the bar substantially as shown at X' in Fig. 16. I then, either with or without reheating, as may be required, place the thicker portion of the article X' along the line indicated in Fig. 16 by the dotted line $u\ u$ upon the cutter B' and cause it to be struck one or more blows with the part of the block A containing the recess or channel B, and thereby splitting or bifurcating the article X'. I then thrust the bifurcated part upon the corner of the die D or the horn of an anvil, and with one or more blows from a common hand-hammer on either side shape the bifurcated ends roughly to the form of a letter U. I then reheat the article, and, the breakdown-dies F F' being properly placed in a drop-forge, I place the article X' upon the die F', so that the bifurcated portions or prongs shall lie upon the parts $a^2\ b^2$ and the sprue $s$ on the part of $s^2$, and cause it to be struck one or more blows with the die F, which forges the article into a shape closely approximating that required, (represented at $X^2$ in Fig. 17.) I then reheat the article X, and, the forming-dies G G' being properly placed in a drop-forge, I place the article $X^2$ upon the die G' so that the parts $a$ and $b$ are upon the parts $a^3\ b^3$, and the sprue $s$ upon the part $s^3$, and cause it to be struck one or more blows with the die G, thus forging it into the form shown at $X^3$ at Fig. 18. The trimmer L and punch M being properly placed in a drop-forge, I place the article $X^3$, without reheating, upon the trimmer L, so that it shall lie in the opening N N, and the flash $o\ o\ o$ rest upon the cut edges $v\ v\ v$, and cause it to be struck with the punch M, thereby removing the flash. I then, with or without reheating, as may be required, replace the article $X^3$, after the flash has been removed from it, again on the die G' and cause it to be struck with the die G, these operating as finishing-dies to correct any inequalities that may have resulted in the preceding process; and if by this last operation any flash should be struck off on the sides I pass the article again through the trimmer L to remove it. The article is then completed in form and outline, as shown at X in Fig. 19, and is cut off from the sprue at the top or lug $f$. This head-blank X thus produced is one homogeneous piece of metal wrought into form and substance, finished by the power of machinery not only rapidly, but with great accuracy, impossible by hand-forging. It requires but little hand-labor to complete the finishing and polishing of its surface, and it is ready to be bored for the handle-bars, the center bolt, the brake-rivets, the trouser-guard, and the lower center concave-cone bearing at $l$, and to receive, by welding or otherwise, the front forks upon the abrupt ends of the arms $a\ b$.

I claim as new and of my invention—

1. The distributing-dies D D', constructed with recesses, and adapted to operate substantially as herein set forth.

2. The cutter and channel dies B B', constructed and adapted to operate in combination with the blocks A A' and dies D D', substantially as shown and described.

3. The breakdown-dies F F', having the intaglio parts $a^2, b^2, c^2, d^2, e^2, f^2, h^2, g^2$, and $s^2$ and the cameo part $k^2$, substantially as shown and described.

4. In breakdown-dies for forging a cylindrical bicycle-head, constructed substantially as described, the recess $i^2$, substantially as set forth.

5. In dies for forging a cylindrical bicycle-head, constructed substantially as herein set forth, the recesses $m^2\ m^2$, substantially as shown and described.

6. The forming-dies G G', constructed with recesses $a^3\ b^3\ c^3\ d^3\ e^3\ f^3\ g^3\ h^3\ s^3\ o'$ and the cameo $k^3$, substantially as set forth.

7. Constructed substantially as herein set forth, the trimmer L, having the opening N and cutting-edges $v\ v$, and the punch M, with the face O O, substantially as shown and described.

8. As an improved article of manufacture, a cylindrical bicycle-head blank constructed in one homogeneous metallic forging, with an arched bridge and arms for attachment to front forks, lugs for handle-bars, an internal cavity to receive a neck and spindle, a brake-lug, trouser-guard lugs, and a step, $l$, at the bottom of the internal cavity, said step being solid therein, and said head-blank having no bore through the lower arched bridge, $c$, all essentially as herein set forth.

HENRY T. RUSSELL.

Witnesses:
   GEO. H. DAY,
   E. J. POST.